United States Patent [19]

Bucking

[11] Patent Number: 5,277,856
[45] Date of Patent: Jan. 11, 1994

[54] METHOD FOR MANUFACTURING SHAPED BODIES FROM GYPSUM, WATER, FIBERS AND LIGHT AGGREGATE PARTICLES

[75] Inventor: Hans G. Bucking, Springe, Fed. Rep. of Germany

[73] Assignee: Bison-Werke Bahre & Greten GmbH & Co. KG, Springe, Fed. Rep. of Germany

[21] Appl. No.: 841,876

[22] Filed: Feb. 26, 1992

Related U.S. Application Data

[63] Continuation of Ser. No. 441,808, Nov. 27, 1989, abandoned.

[30] Foreign Application Priority Data

Dec. 2, 1988 [DE] Fed. Rep. of Germany ....... 3840718

[51] Int. Cl.$^5$ ...................... B29C 31/00; C04B 14/18; C04B 14/20
[52] U.S. Cl. .................................. 264/112; 264/121; 264/122
[58] Field of Search ....................... 156/39, 42, 43, 45, 156/346; 106/780; 264/112, 113, 121, 122, 333; 425/83.1

[56] References Cited

U.S. PATENT DOCUMENTS

| | | | |
|---|---|---|---|
| 837,717 | 12/1906 | Perry | 264/121 |
| 1,862,318 | 6/1932 | Ruby | 264/112 |
| 2,076,349 | 4/1937 | Porter | 106/780 |
| 2,803,575 | 8/1957 | Riddell et al. | 156/39 |
| 3,719,513 | 3/1973 | Bragg et al. | 106/780 |
| 4,019,920 | 4/1977 | Burkard et al. | 156/39 |
| 4,328,178 | 5/1982 | Kossatz | 156/39 |
| 4,902,348 | 2/1990 | Kossatz et al. | 156/42 |
| 4,942,003 | 7/1990 | Bold | 156/39 |
| 5,171,498 | 12/1992 | Powell | 264/113 |

FOREIGN PATENT DOCUMENTS

| | | | |
|---|---|---|---|
| 1261125 | 9/1989 | Canada | 156/39 |
| 2847109 | 5/1980 | Fed. Rep. of Germany | 264/121 |
| 0772581 | 4/1957 | United Kingdom | 156/42 |

OTHER PUBLICATIONS

*Hackh's Chemical Dictionary*, 1969, p. 554.

Primary Examiner—Michael W. Ball
Assistant Examiner—Steven D. Maki
Attorney, Agent, or Firm—Townsend and Townsend Khourie and Crew

[57] ABSTRACT

A method of manufacturing shaped bodies, in particular boards, out of gypsum, water of hydration and comminuted fibers containing lignocellulose and/or cellulose is described in which all components are combined into a single starting mixture and at least one water saturated, essentially ground-moist, light aggregate is dispersed in this mixture as a fixed pore former. From this starting mixture there is formed a mat which is built up symmetrically in cross-section by means of a single double-sided wind sifting scattering process wherein the light aggregates are located in the central layer. This mat which is built up symmetrically in cross-section is pressed while supplying heat.

17 Claims, 3 Drawing Sheets

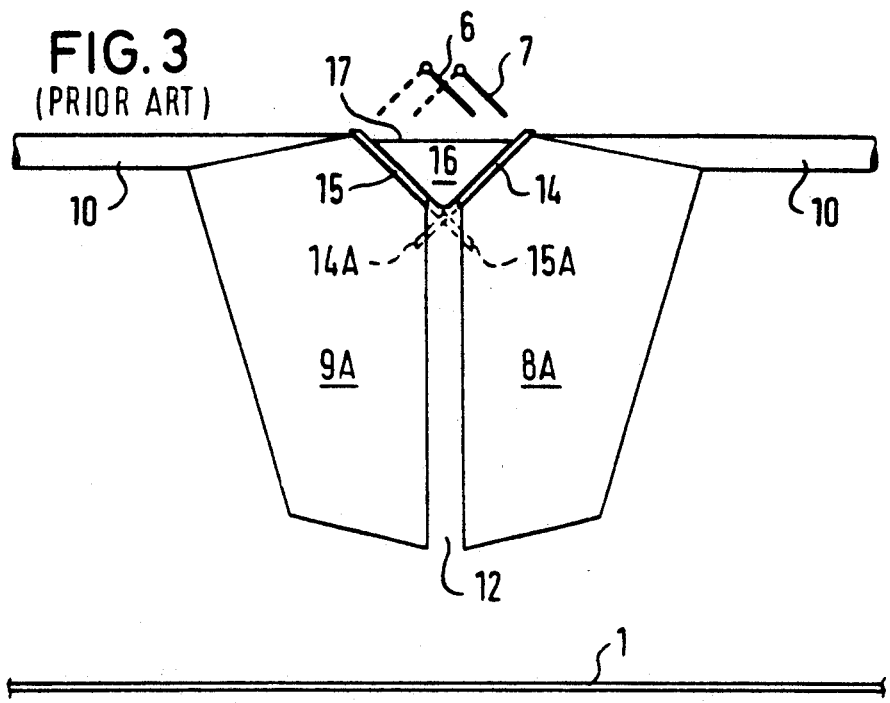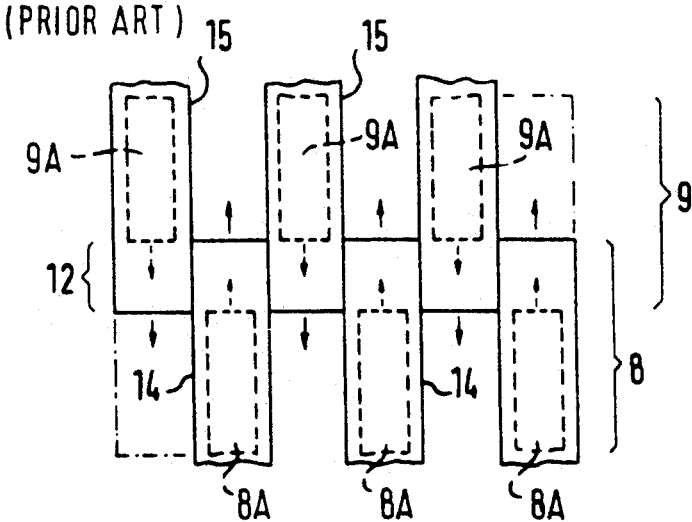

METHOD FOR MANUFACTURING SHAPED BODIES FROM GYPSUM, WATER, FIBERS AND LIGHT AGGREGATE PARTICLES

RELATED APPLICATIONS

This is a continuation of application Ser. No. 07/441,808 filed Nov. 27, 1989, now abandoned.

BACKGROUND OF THE INVENTION

The invention relates to a method of manufacturing shaped bodies, in particular boards, from mixtures containing gypsum, water of hydration for the gypsum and comminuted fibers containing lignocellulose and/or cellulose, wherein a mat which can be pressed into shaped bodies is formed from the mixtures by means of scattering onto a moving substrate.

A method for the continuous manufacture of shaped bodies, in particular of boards, is known from DE-OS 34 39 493 or its equivalent CA-PS 1,261,125 in which, in order to obtain higher board strengths, provision is made for splitting up at least one mass flow of a moistened gypsum fiber mixture into partial mass flows which are separate from one another, for scattering each partial mass flow to form a layer of a multi-layer shaped body onto a substrate or onto a proceeding layer, and for subsequently moistening each scattered layer with water, with the quantity of water which is supplied to a shaped body being so dimensioned that it amounts to 25% more than the stochiometric quantity of water required for the curing of the gypsum-fiber mixture scattered to form the shaped body. A disadvantage is that the realization of this method requires much complexity and effort and is thus expensive.

Moreover, one obtains in practice neither a satisfactory uniform moistening of the mat nor of the multi-layer shaped body that is obtained which negatively influences its homogeneity and surface quality.

SUMMARY OF THE INVENTION

In one aspect of the invention, shaped bodies, in particular boards, are manufactured from a first mixture containing gypsum, water of hydration for the gypsum, and comminuted fibers containing lignocellulose and/or cellulose. A starting mixture is formed from the first mixture which contains at least one water saturated, essentially ground, moist, light aggregate, such as perlite and/or pumice and/or vermiculite and/or the like as a fixed pore former. The starting material is transported as one string or flow to a scattering apparatus where a mat of symmetrical cross-section having three layers that merge into one another without steps is formed. Finally pressing of the mat is subsequently effected while applying heat.

In a preferred embodiment, the starting mixture contains a strength increasing component such as, for example, a water soluble starch that is preferably premixed with the gypsum in a dry state.

In another preferred embodiment an additional quantity of water is only applied to the surfaces of the two covering layers of the mat that is formed.

In another preferred embodiment, starting mixture is formed of a mixture (a), (b), and (c). The first mixture (a) has 100 parts by weight of gypsum and approximately 3 to 8 parts by weight of a strength increasing component, such as water soluble starch or the like. The second mixture (b) has between 2 to 10 parts by weight of light aggregate particles and a maximum of 20 parts by weight water. The third mixture (c) has between 5 and 30 parts by weight of fibers of lignocellulose and 15 to 20 parts by weight of water.

In another preferred embodiment, mixture (b) is first added to mixture (c), then mixture (a) is added to the mixture of (b) and (c). The fibers in mixture (c) are loosened or fluffed prior to addition of mixture (a) and mixture (b) with mixture (c).

In other preferred embodiments, the additional quantity of water for the surfaces of the two covering layers of the mat is at least 350 g/m$^2$; the mat is pressed at a press temperature of less than 60° C. and at a press pressure of a maximum of 15 bars into a shaped body; and the pressing of the mat takes place continuously and/or discontinuously.

The present invention is based on the object of providing a method of the initially named kind in accordance with which qualitatively high value shaped bodies, in particular boards, can be manufactured in a particularly economical manner, even with a bulk density of $\leq 950$ kg/m$^3$.

In accordance with the invention this object is satisfied in that a single starting mixture is formed from the mixtures which contain at least one water saturated, essentially ground-moist, light aggregate such as perlite and/or pumice and/or vermiculite and/or the like as a fixed pore former; the starting mixture is transported to a scattering apparatus; air is blown on a portion of the starting mixture with the scattering apparatus in a first direction and air is blown on another portion of the starting mixture with the scattering apparatus in a second direction which is opposite to the first direction, thereby forming a mat of symmetrical cross-section having three layers which merge into one another without steps; and in that a pressing of the mat is subsequently effected while supplying heat.

As a result, the previously required subdivision of at least one mass flow of a moist gypsum/fiber mixture into partial mass flows which are separate from one another is avoided since now a single string transport of the output mixture to a scattering apparatus takes place, whereby a notable simplification and a reduction in the cost of the manufacturing effort is attained. The single wind sifting scattering process which is carried out on two sides in place of the known method with several separate scattering heads contributes to this to a considerable degree.

BRIEF DESCRIPTION OF THE DRAWINGS

FIG. 3 is a schematic side view of an arrangement of register groups made in accordance with German Offenlegungsschrift patent 28 47 109, FIG. 4 is a plan view of the hopper chute compartment of the arrangement of register groups according to FIG. 3.

DESCRIPTION OF THE APPARATUS OF GERMAN OFFENLEGUNGSSCHRIFT 2,847,109

FIGS. 1-7 and the following descriptions thereof form part of the prior art and are disclosed in German patent 2,847,109.

Figure 1:
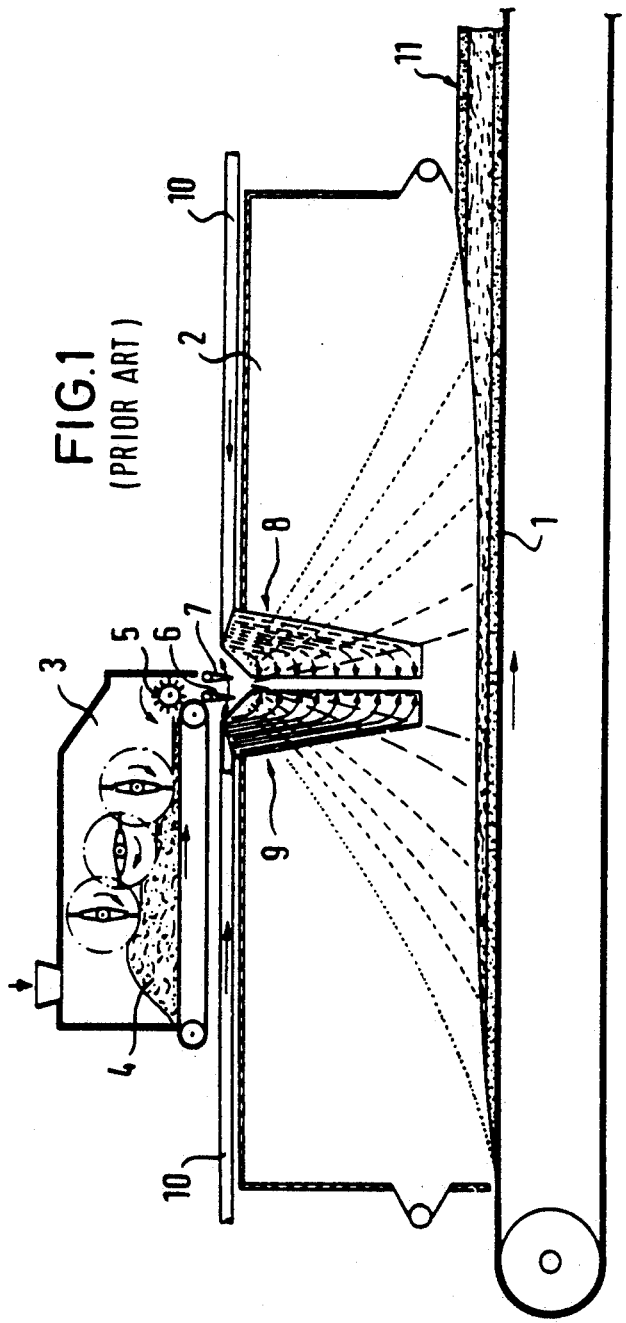
FIG. 1 shows a longitudinal cross-section through a scattering apparatus in which the sifting air streams are led into the scattering chamber by means of two register groups.

The schematic representation of FIG. 1 shows a scattering chamber 2 having an associated metering device 3, arranged above a mat carrier 1 having the form of an endless belt. In the metering device 3, a material 4 comprised of very small, small and coarse pasted chips is transferred by means of an endless belt in a defined manner to an outlet place at which a roller 5 performs a regular delivery of material.

Two deflection plates 6, 7 driven in pendulum-like manner are arranged below the outlet place in order to lead the scattering material toward the register groups 8, 9 arranged therebelow.

Sifting air is admitted to the two register groups 8, 9 from a ventilator (not illustrated) via ducts 10. The particles are blown and carried by the air streams exiting from the register groups, and in fact along a path which depends on their size. By virtue of this known principle of the wind sifting scattering, one obtains a mat 11 having a structure whose cross-section is symmetrical and contains very small particles in the outer layers and coarse particles in the central layer, in a continuous transition.

Figure 2:
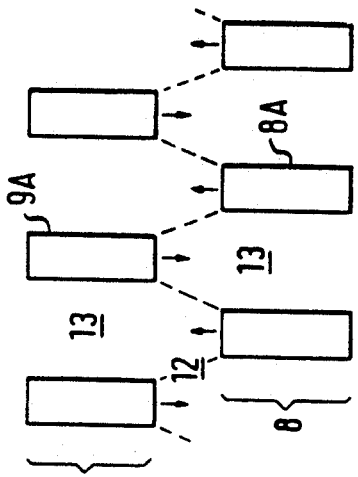
FIG. 2 is a schematic partial plan view of register groups of a scattering apparatus.

The schematic partial plan view of register groups which can be used in a scattering device according to FIG. 1 and illustrated in FIG. 2 shows that the individual registers 8A of the one register group 8 are mutually separated by spaces and offset sideways with respect to the individual registers 9A of the other oppositely disposed registered group 9 such that the air streams exiting from the oppositely disposed front side of the individual registers are each directed towards the intermediate space 13 located opposite the individual registers.

In order to mutually restrict the sifting air streams exiting from the individual registers and directed in mutually opposite directions in the space 12 lying between the register groups, partitions can be provided extending through the space between the register groups as indicated in broken lines in FIG. 2. These partitions in particular avoid the formation of turbulences in the space between the register groups.

The schematic side view of FIG. 3 shows the individual registers 8A and 9A arranged in staggered manner and supplied with sifting air via air ducts 10, the sifting air exiting as already mentioned from the front side of the individual registers through a plurality of openings.

In the region of admission of the particles to be scattered, an inclined guide surface 14, 15 is associated with each individual register of the entire arrangement of register groups, such that the inclined guide surfaces of both oppositely disposed register groups form a hopper chute 16 leading to the space 12 between the register groups. The opening width of this hopper chute 16 is at least equal to the maximal extension of the material flow of the mixture of particles coming from the metering device.

An arrangement comprising two spaced apart and swinging deflection plates 6, 7 is suitably provided between the metering device, which is not particularly shown in FIG. 3, and the hopper chute 16, the deflection plates 6, 7 being driven back and forth in operation in pendulum-like manner. It is important in this case that the opening width of the hopper chute 16 is greater than the swinging range of the deflection plates 6, 7.

The inclined guide surfaces 14, 15 engage in the intermediate space 12 between the register groups with each other in the manner of meshing teeth, and they extend preferably at least until the beginning of the respective oppositely disposed intermediate space between individual registers. This is indicated in broken lines under references 14A and 15A in FIG. 3. For the purpose of influencing the scattering symmetry of the mat, the length of the inclined guide surfaces 14, 15 can be selected somewhat differently.

The hopper chute compartment is divided by means of several spaced apart partitions 17 in the embodiment of FIG. 3. These partitions 17 extend at least essentially parallel to the individual registers and promote the equalization of the surface density distribution in the mat. These partitions can be designed in the form of triangles or trapezes and can also have other suitable forms as necessary.

The plan view of FIG. 4 shows a partial region of the arrangement of register groups consisting of the individual registers 8A on the one hand and 9A on the other hand supplied with sifting air. An inclined guide surface 14, 15 is associated with each individual register, and the width of these inclined guide surfaces is selected, in the illustrated embodiment, in such a manner that the inclined guide surfaces directly adjoin each other. This represents however only an exemplary embodiment, and it will be advantageous in other cases to select a smaller width for these inclined guide surfaces, such that in an extreme case this width is essentially equal to the width of the associated individual register.

Starting from the respective individual register, the inclined guide surfaces 14, 15 extend preferably at least until the beginning of the oppositely disposed intermediate space between individual registers such that there are finger-like intermeshing results in the intermediate space 11 of register groups between the individual inclined guide surfaces. The arrangement according to FIG. 4 further contributes to the fact that the air turbulences occurring in the intermediate space between register groups have practically no detrimental effect.

The inclined guide surfaces 14, 15 can be formed by a corresponding design of the rear portion of the registers but it is also possible to use inclined guide surfaces consisting of separate plates which are fixed with respect to the respective associated individual register.

Preferably the inclined guide surfaces have the form of a channel and comprise side walls to that effect, which extend generally perpendicular with respect to the bottom surface in the lower region of the inclined guide surfaces, and are however inclined towards the bottom in their upper region such that a part of the incoming material flow is directed directly into the adjacent sifting air channels. In this case it is necessary that the width of the inclined guide surfaces corresponds at least essentially to the width of the associated individual register.

Figure 5:
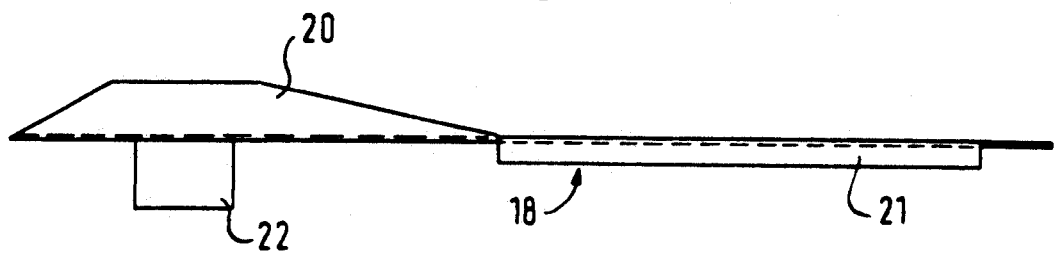
FIG. 5 is a side view of an inclined guide plate.

FIG. 5 shows a side view of an embodiment of an inclined guide surface plate 18 which comprises in its lower region, or in other words the deepest region in the assembled state, upwardly directed side walls 20 generally perpendicular to the surface of the bottom and in the upper region downwardly directed surfaces 21 perpendicular to the surface of the bottom.

For allowing a simple fixation of these plates 18 in position with respect to the respective individual register, there is also provided, in addition to the surfaces 21, a U-shaped bracket 22, a stop clamp or the like, by means of which the plates 14, 15 can be attached to the associated register. It is therefore not necessary to fasten the uppermost free and onto the register.

Figure 6:
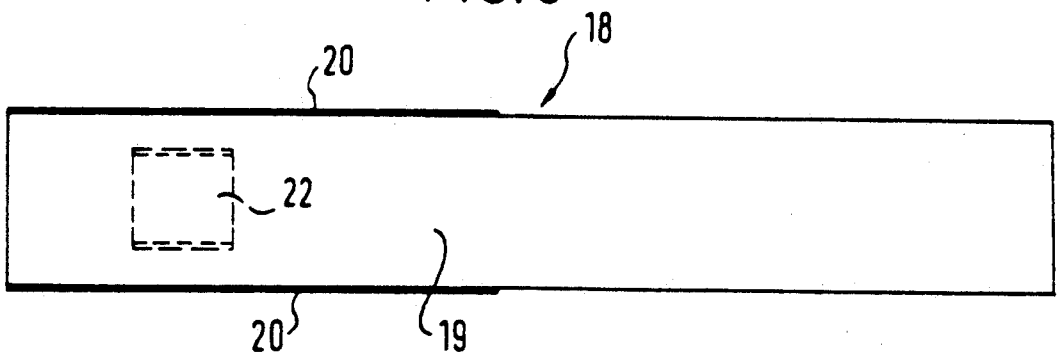
FIG. 6 is a plan view of the guide plate of FIG. 5.

FIG. 6 shows the special shape in the upper region of the inclined guide surfaces. It is apparent from this illustration that a certain portion of material can directly fall into the adjacent sifting air channels. This also facilitates and accelerates the continuous sliding of the material portion arriving onto the lower regions of the inclined guide surfaces and therefore prevents possible risks of obstruction. Particularly good results will be achieved when the inclined guide surface plate 18 is placed at an angle greater than or equal to 45 degrees.

Figure 7:
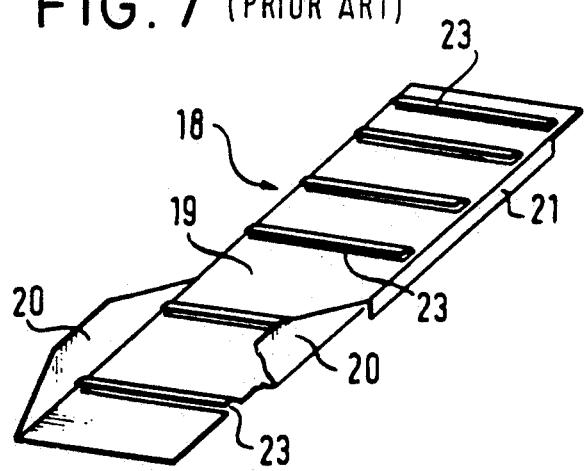
FIG. 7 is a perspective representation of an advantageous development of the inclined guide plate of FIGS. 5 and 6.

Further advantages arise from the embodiments of the inclined guide plate shown in FIG. 7. In this case, a carrying air cushion is achieved by means of several air exit slits 23 extending preferably over the entire width of the bottom surface 19, the air cushion having a strongly marked transport component parallel to the bottom surface by virtue of the design of these slits 23 and permitting a very fast ejection of the incoming material without problems. The air exit slits 23 can be closer to each other in the upper region of the inclined surface plate 18, such that the transport component parallel to the bottom surface 19 is particularly strongly marked in this upper region.

A simple solution for achieving a transport air stream essentially parallel to the bottom surface 19 consists in forming directly from the bottom plate the necessary directive surface and the surfaces for fixation of the inclined surface plate 18, as shown in FIG. 7.

DESCRIPTION OF THE PREFERRED EMBODIMENT

The present invention relates to a method of manufacturing shaped bodies out of gypsum, water of hydration for the gypsum, comminuted fibers, and light aggregate particles, this method comprising the steps of: a) forming a starting mixture from gypsum in a dry state, light aggregate particles having fixed pores and saturated with water, and comminuted fibers; and b) transporting a single flow of the starting mixture to a scattering apparatus, blowing air on a portion of the starting mixture with the scattering apparatus in a first direction and blowing air on another portion of the starting mixture with the scattering apparatus in a second direction, which is opposite to the first direction, to form a mat of symmetrical cross-section having two outer layers and a center layer which continuously merge into one another. In the scattering process, which is preferably carried out with an apparatus of the kind described hereinabove in connection with FIGS. 1 to 7, all of the water-saturated light aggregate particles in the starting mixture come together with a part of the gypsum and part of the comminuted fibers present in the starting mixture in the central layer of the mat, which is a consequence of the weight increase which results through the water saturation. This method is followed by a further step c) of pressing said mat into a shaped body at an elevated temperature.

The covering layers of the mat are thus free of light aggregate particles. Through this and through the pressing of the mat with the supply of heat it is possible to manufacture boards, in particular boards with a bulk density of $\leq 950$ kg/m$^3$, which moreover are characterized by dense smooth surfaces of high strength and a bending strength such that they can be used for wall constructions, non-load bearing partition walls, ceiling elements and other fields of application.

It has shown itself to be sensible to apply an additional quantity of water only to the surfaces of the two covering layers of the mat, since this measure leads during pressing of the mat to an increased bending strength of the resultant shaped body.

In accordance with another form of the method of the invention the starting mixture contains a strength increasing component such as for example water soluble starch. This component is preferably premixed with the gypsum in the dry state.

An embodiment of the invention will now be described in more detail in the following.

100 parts by weight of plaster of Paris in accordance with DIN 1168 were premixed with 5 parts by weight of water soluble starch in a dry state (mixture a)). At the same time the manufacture took place, on the one hand, of a mixture of 5 parts by weight of perlite (1 mm$\leq$grain size$\leq$3 mm) and 20 parts by weight of water (mixture b)) and, on the other hand, of a mixture of 15 parts by weight paper fibers and 20 parts by weight of water (mixture c)), with subsequent loosening up (fluffing). Thereupon the following events took place in sequence:

Mixing of the starting mixture from the individual mixtures a), b) and c)

single string transport of the starting mixture to a scattering apparatus which operates by wind sifting, for example in accordance with the method described hereinabove in connection with FIGS. 1 to 7 in the vicinity of this apparatus application of an additional quantity of water of 250 g/m$^2$ to each of the surfaces of the two covering layers of the mat pressing of the mat at a press temperature of $\leq 60°$ C., a maximum press pressure of 10 bars and a press time of 60 seconds, and drying of the boards that are obtained to a moisture content of $\leq 1\%$.

Under the above named process conditions of the invention 10 mm thick boards achieve a bulk density (kg/m$^3$) in the region of $\leq 950$ and 1150 respectively and a bending strength (N/mm$^2$) in the region from $\geq 5.0$ and 11.0 respectively (in dependence on the press pressure circa 7 bars or a maximum of 10 bars).

I claim:

1. A method of manufacturing shaped bodies comprising the steps of:
   a) forming a starting mixture from gypsum in a dry state, light aggregate particles having pores which are saturated with water, and comminuted fibers;
   b) blowing air on a portion of the starting mixture in a first direction and blowing air on another portion of the starting mixture in a second direction, which is opposite to the first direction, to form a mat of symmetrical cross section having two outer layers and a center layer which continuously merge into one another, wherein said center layer comprises the light aggregate particles, part of the gypsum, and part of the comminuted fibers, and said outer layers are free of light aggregate particles; and
   c) pressing the mat into a shaped body at an elevated temperature, wherein the shaped body has smooth, dense surfaces of high strength.

2. A method of manufacturing shaped bodies comprising the steps of:

a) forming a starting mixture from gypsum in a dry state, light aggregate particles having pores which are saturated with water, and comminuted fibers;

b) transporting a single flow of the starting mixture to a scattering apparatus, blowing air on a portion of the starting mixture with the scattering apparatus in a first direction and blowing air on another portion of the starting mixture with the scattering apparatus in a second direction, which is opposite to the first direction, to form a mat of symmetrical cross section having two outer layers and a center layer which continuously merge into one another, wherein said center layer comprises the light aggregate particles, part of the gypsum, and part of the comminuted fibers, and said outer layers are free of light aggregate particles; and c) pressing the mat into a shaped body at an elevated temperature, wherein said shaped body has dense, smooth surfaces.

3. A method of manufacturing shaped bodies out of gypsum, water of hydration for the gypsum, comminuted fibers, and light aggregate particles, the method comprising the steps of:

a) forming a starting mixture from gypsum in a dry state, light aggregate particles having pores which are saturated with water, and comminuted fibers;

b) transporting a single flow of the starting mixture to a scattering apparatus, blowing air on a portion of the starting mixture with the scattering apparatus in a first direction and blowing air on another portion of the starting mixture with the scattering apparatus in a second direction, which is opposite to the first direction, to form a mat of symmetrical cross section having two outer layers and a center layer which continuously merge into one another, wherein said center layer comprises the light aggregate particles, part of the gypsum, and part of the comminuted fibers, and said outer layers are free of light aggregate particles; and c) pressing said mat into a shaped body at an elevated temperature.

4. The method of claim 3 wherein said mat is pressed at a press temperature less than 60° C. and at a maximum press pressure of 15 bars into a shaped body.

5. The method of claim 3 wherein the mat is pressed continuously.

6. The method of claim 3 wherein said comminuted fibers contain fibers selected from a group consisting of lignocellulose fibers, cellulose fibers, and a mixture of lignocellulose and cellulose fibers.

7. The method of claim 6 wherein said starting mixture further comprises a strength increasing component.

8. The method of claim 7 wherein said strength increasing component comprises a water soluble starch.

9. The method of claim 6, further comprising the step of applying water to the outer surfaces of the two outer layers of the mat after step b) and before step c).

10. The method of claim 9 wherein the step of applying water to the outer layers of the mat comprises applying at least 350 g/m$^2$ of water to the layers.

11. The method of claim 6 wherein said starting mixture comprises:

a first mixture having 100 parts by weight of gypsum and 3 to 8 parts by weight of a strength increasing component, a second mixture having between 2 to 10 parts by weight of the light aggregate particles and a maximum of 20 parts by weight water, and a third mixture having between 5 to 30 parts by weight of fibers including lignocellulose and 15 to 20 parts by weight of water.

12. The method of claim 11 wherein said second mixture is first added to the third mixture and then the first mixture is added to the second and third mixtures.

13. The method of claim 11 wherein the fibers of the third mixture are loosened prior to adding the first and second mixtures into the third mixture.

14. The method of claim 11 wherein said first mixture comprises 5 parts by weight of a strength increasing component.

15. The method of claim 11 wherein said first mixture comprises five parts by weight of the light aggregate particles.

16. The method of claim 6 wherein said light aggregate is selected from a group comprising perlite, pumice, vermiculite, or mixtures thereof.

17. The method of claim 3, including the step of adding water to the comminuted fibers prior to forming the starting mixture.

* * * * *